United States Patent
Alwattari et al.

(10) Patent No.: US 9,725,638 B2
(45) Date of Patent: Aug. 8, 2017

(54) COMPOSITION AND METHOD FOR GELLING FRACTURING FLUIDS

(71) Applicant: HALLIBURTON ENERGY SERVICES, INC., Houston, TX (US)

(72) Inventors: Ali Alwattari, Humble, TX (US); Prashant D. Chopade, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/900,382

(22) PCT Filed: Aug. 9, 2013

(86) PCT No.: PCT/US2013/054290
§ 371 (c)(1),
(2) Date: Dec. 21, 2015

(87) PCT Pub. No.: WO2015/020669
PCT Pub. Date: Feb. 12, 2015

(65) Prior Publication Data
US 2016/0152888 A1    Jun. 2, 2016

(51) Int. Cl.
| | |
|---|---|
| E21B 43/26 | (2006.01) |
| C09K 8/68 | (2006.01) |
| C09K 8/60 | (2006.01) |
| C09K 8/88 | (2006.01) |
| C09K 8/90 | (2006.01) |
| C09K 8/80 | (2006.01) |

(52) U.S. Cl.
CPC .............. *C09K 8/68* (2013.01); *C09K 8/602* (2013.01); *C09K 8/80* (2013.01); *C09K 8/88* (2013.01); *C09K 8/90* (2013.01); *E21B 43/26* (2013.01)

(58) Field of Classification Search
CPC .............. C09K 8/68; C09K 8/80; E21B 43/26
USPC ................. 166/308.1, 250.1, 280.2, 305.1
See application file for complete search history.

(56) References Cited

U.S. PATENT DOCUMENTS

| | | | |
|---|---|---|---|
| 4,212,747 A | 7/1980 | Swanson | |
| 7,621,334 B2 * | 11/2009 | Welton | C09K 8/528 166/305.1 |
| 2007/0135313 A1 | 6/2007 | King et al. | |
| 2008/0234147 A1 | 9/2008 | Li et al. | |
| 2009/0291864 A1 | 11/2009 | Hartshorne et al. | |
| 2010/0022418 A1 | 1/2010 | Milne et al. | |
| 2010/0122815 A1 * | 5/2010 | Zamora | C09K 8/703 166/280.2 |

(Continued)

FOREIGN PATENT DOCUMENTS

WO    2011086361    7/2011

OTHER PUBLICATIONS

International Patent Application No. PCT/US2013/054290, International Search Report and Written Opinion, mailed May 26, 2014, 11 pages.

*Primary Examiner* — Silvana Runyan
(74) *Attorney, Agent, or Firm* — Kilpatrick Townsend & Stockton LLP

(57) ABSTRACT

Described herein are compositions for use in treating subterranean formations where the compositions include a water soluble polymer and an ionic surfactant. In preferred compositions, the polymer and surfactant are oppositely charged. Methods of using the compositions also are disclosed.

19 Claims, 1 Drawing Sheet

(56) References Cited

U.S. PATENT DOCUMENTS

| | | | | |
|---|---|---|---|---|
| 2010/0307752 A1* | 12/2010 | Rey | ............... | C09K 8/68 |
| | | | | 166/305.1 |
| 2011/0054042 A1* | 3/2011 | Wu | ............... | A01N 25/04 |
| | | | | 514/772.4 |
| 2011/0174492 A1* | 7/2011 | Robb | ............... | C09K 8/524 |
| | | | | 166/308.2 |
| 2011/0223125 A1* | 9/2011 | Hough | ............... | A61K 8/8152 |
| | | | | 424/70.12 |

* cited by examiner

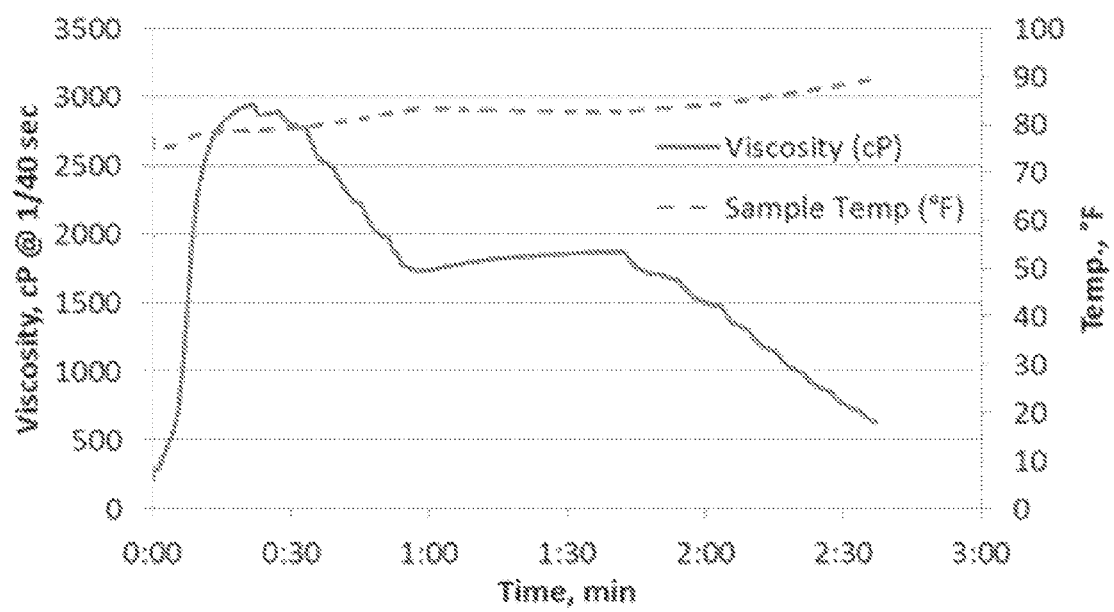

COMPOSITION AND METHOD FOR GELLING FRACTURING FLUIDS

CROSS-REFERENCE TO RELATED APPLICATIONS

This is a U.S. national phase under 35 U.S.C. §371 of International Patent Application No. PCT/US2013/054290, titled "Composition and Method for Gelling Fracturing Fluids" and filed Aug. 9, 2013, the entirety of which is incorporated herein by reference.

TECHNICAL FIELD

This application relates to methods and compositions for treating subterranean formations. More particularly, the application relates to novel gel compositions including ionic surfactants and use of same as fracturing gels.

BACKGROUND

Viscous fluids are used in a variety of operations and treatments in oil and gas wells. Such operations and treatments include forming gravel packs in well bores, fracturing producing zones, performing permeability control treatments and the like. Hydrocarbon producing wells are often stimulated by hydraulic fracturing treatments. In hydraulic fracturing, a viscous fracturing fluid is pumped into a subterranean formation at a rate and pressure such that one or more fractures are formed or enhanced in the formation. After the fractures are formed or enhanced, the fluid viscosity is reduced and the fluid is removed from the formation. In some cases, the fracturing fluid also functions as a carrier fluid, carrying proppant particles, e.g. graded sand, into the fractures. The proppant particles are suspended in the fracturing fluid and are deposited in the fractures when the fracturing fluid viscosity is reduced. More viscous fracturing fluids can more effectively form or extend fractures and carry proppant particles.

Fracturing fluids typically are made viscous by use of polymeric materials. Generally, the more polymer that is used, the more viscous the fluid will become. For example, polymers such as cellulose, guar, and their derivatives have been used to form aqueous gel treating fluids having viscosities on the order of 1000's of centipoise. Gels made with linear polymers sometimes have sufficient viscosity to create fractures in some rock formations. For other formations, however, more viscous gels and/or gels with more internal structure are desirable. The polymeric material may be crosslinked to increase viscosity and build internal structure. The internal structure created by crosslinking is important because for at least some formations the fluid must be able to carry proppant, e.g. sand particles, into the fractures. Without internal structure proppant may settle out of the fluid even if the fluid is very viscous.

Fracturing fluids often include breakers for reducing the viscosity of the fluid after the fluid has effected fractures and/or positioned proppant particles. Breakers degrade polymers in the treating fluid, thus breaking the gel and reducing the fluid's viscosity. Breaking the gel converts the viscous fluid into a more free flowing fluid, which can be removed from the formation more easily than a viscous fluid. The thinned fluid also allows oil and/or natural gas to more freely flow out of the formation. Thinning the fluid also reduces the likelihood that the polymer will contribute to an oil/water emulsion. Unbroken polymer can stabilize emulsions of oil and water, which causes problems when the oil is extracted. The thinned fluid also leaves proppant particles in fractures where they function to prevent the fractures from closing and help to form conductive channels through which hydrocarbons and/or natural gas readily can flow.

Known breakers may be liquids or solids, and include, but are not limited to, chemical oxidizers, enzymes, and acids. Breakers are formulated to remain inactive while the treating fluid is introduced to the subterranean formation and until a reduction in viscosity is desired. The breaker may be formulated to be "activated" by certain conditions in the fluid (e.g., pH, temperature, etc.) and/or by interaction with some other substance. Alternatively, the breaker may be encapsulated with a coating that delays release of the breaker. Typically liquid breakers are activated by temperature or time delay. Another method of controlling breaker activity is by loading concentration of the breaker.

It would be advantageous to provide a simpler composition for use in fracturing operations. It would be advantageous to provide a composition including a gel that need not be broken after the fracturing operation is complete. And it would be advantageous to provide a composition that could be used under a wide variety of conditions.

BRIEF DESCRIPTION OF THE DRAWING

FIG. 1 is a graph showing the viscosity profile of a composition including an anionic polymer and cationic surfactant.

DETAILED DESCRIPTION

Compositions described herein are useful as fluids for treating subterranean formations. In some embodiments described herein, the compositions are useful as fracturing fluids to enhance production of oil and natural gas from subterranean formations by creating and/or enhancing one or more fractures in the formations.

As used herein, the term "treat," "treatment," or "treating, refers to any subterranean operation that uses a fluid in conjunction with a desired function and/or for a desired purpose. The terms "treat," "treatment," and "treating," as used herein, do not imply any particular action by the fluid or any particular component thereof.

"Enhancing" one or more fractures in a subterranean formation, as that term is used herein, is defined to include the extension or enlargement of one or more natural or previously created fractures in the subterranean formation.

The compositions include anionic or cationic surfactants. In some embodiments the compositions include mixtures of oppositely charged polymers and surfactants. In one embodiment, a composition includes an anionic polymer and a cationic surfactant. In still another embodiment, a composition includes a cationic polymer and an anionic surfactant. In another embodiment, the polymer is neutral and the surfactant is anionic or cationic.

Surprisingly, in the compositions described herein, the opposite charges do not cause precipitation or coagulation, but rather the compositions show excellent shear thickening properties. In addition, the compositions have extensional viscosity such that the friction, or drag of the fluid, is low, which prevents excessive pressure on mechanical equipment and allows the fluid to easily penetrate the pores of the rock. Although in some embodiments the polymers are not covalently crosslinked, the network formed between the oppositely charged polymer and surfactant provides sufficient structure to form a gel and to carry proppant particles into the formations. Moreover, in some embodiments the compositions are self-thickening, i.e., no separate thickening agent such as starch, carbopol, or clay-based thickener is required.

Compositions described herein generally may include any polymer known and used in fracturing operations, but are not limited to such polymers. Suitable polymers generally include any water-soluble polymer, but preferred polymers include any water-soluble polysaccharide or derivative thereof, polymers having quaternary ammonium groups in the backbone or a side chain, and synthetic anionic polymers, such as polyamines, polyacrylamide, polyglutamate, and polyacrylate. The polymers may be used in the form of salts and/or may be used in combination as copolymers or blends.

In some embodiments the polymers are anionic. Suitable anionic polymers include polysaccharides and their derivatives, such as, but not limited to, dextran sulfate, hyaluronate, alginate, heparan sulfate, and carboxymethyl cellulose. Suitable anionic polymers also include synthetic anionic polymers, such as polystyrene sulfonate, polyamines, polyacrylamides, polyglutamates, and polyacrylic acid. Any of the polymers may be in the form of a salt, for example, sodium polystyrene sulfonate, sodium polyacrylate, or sodium carboxymethyl cellulose. The polymers may also be used in combination as copolymers or blends. Moreover, anionic character may be imparted to a polymer by copolymerization with an anionic monomer. For example, the homopolymer of polyacrylamide is a nonionic polymer; however, acrylamide can be copolymerized with acrylic acid to give an acrylamide polymer with anionic character. That copolymer typically is referred to as anionic polyacrylamide. Preferred anionic polymers include sodium carboxymethyl cellulose.

In some embodiments, the polymers are cationic. Suitable cationic polymers include polymers having a quaternary ammonium group in the backbone or in side chains. Such polymers include the polymers known as polyquaterniums. Preferred polyquaterniums include, but are not limited to, polyquaternium-10 (quaternized hydroxyethyl cellulose), polyquaternium-7 (copolymer of acrylamide and diallyldimethylammonium chloride), and polyquaternium-11 (copolymer of vinylpyrrolidone and quaternized dimethylamino ethyl methacrylate). Another suitable cationic polymer is guar hydroxypropyltrimonium chloride. Other suitable cationic polymers include copolymers of acrylamide and a cationic monomer, referred to as cationic polyacrylamide. Some such cationic polyacrylamides are sold under the Praestol™ brand as aqueous cationic polymers.

In some embodiments the polymers are neutral. Preferred neutral polymers include polysaccharides, such as hydroxypropyl cellulose, guar, and derivatives thereof.

In some embodiments of the compositions described herein, the polymer may be present in the treating fluid in an amount between about 0.01 wt % and about 30 wt %. More preferably, the polymer is present in an amount between about 0.1 wt % and about 12 wt %.

Surfactants suitable for use in the compositions described herein include, but are not limited to, any surfactant known and used in fracturing operations. In some embodiments the surfactant is cationic. Suitable cationic surfactants include those having a quaternary ammonium. For example, suitable cationic surfactants include, cetyltrimethylammonium bromide (CTAB), behenyltrimethylammonium chloride, benzalkonium chloride, benzethonium chloride, cetrimonium bromide, cetrimonium chloride, dimethyldioctadecylammonium chloride, lauryl methyl gluceth-10 hydroxypropyl dimonium chloride, and tetramethylammonium hydroxide. Other suitable cationic surfactants include 5-bromo-5-nitro-1,3-dioxane.

In some embodiments the surfactant is anionic. Suitable anionic surfactants include, but are not limited to, ammonium lauryl sulfate, dioctyl sodium sulfosuccinate, perfluorobutanesulfonic acid, perfluorononanoic acid, perfluorooctanesulfonic acid, perfluorooctanoic acid, potassium lauryl sulfate, sodium dodecyl sulfate, sodium dodecylbenzenesulfonate, sodium laureth sulfate, sodium lauroyl sarcosinate, sodium myreth sulfate, sodium pareth sulfate, sodium stearate.

The amount of surfactant is important. Too much surfactant will cause precipitation of the polymer. Surfactant in an amount between about 0.01 wt % and about 40 wt % allows the polymer and surfactant to form a networked material without the use of covalent bond crosslinks. More preferably, the surfactant is present in an amount between about 0.1 wt % and about 12 wt %. While conventional wisdom is that high levels of surfactant are required to create a viscous material with rheology appropriate for a fracturing fluid, compositions disclosed herein include only a modest amount of surfactant, yet achieve similar results.

The polymer and surfactant may be combined by first hydrating the polymer in water, then adding the surfactant and any additives and mixing. Methods of preparing the treating fluids will be recognized by those skilled in the art, with the benefit of this disclosure.

In some embodiments a composition for treating a subterranean formation includes at least a polymer and an ionic surfactant. The polymer may be any polymer described herein or equivalent thereof. The surfactant may be any surfactant described herein or equivalent thereof. In embodiments where the polymer is anionic, the surfactant is cationic, i.e, the polymer and the surfactant are oppositely charged. In embodiments where the polymer is cationic, the surfactant is anionic. In some embodiments the polymer is neutral and the surfactant is either anionic or cationic.

In some embodiments, the polymer comprises a polysaccharide, derivative, or equivalent thereof. In some embodiments, the polymer is, or includes, sodium carboxymethylcellulose or an equivalent thereof. In some embodiments, the surfactant includes a quaternary ammonium or equivalent thereof. In some embodiments, the surfactant is CTAB or an equivalent thereof.

In some embodiments, it is not necessary to crosslink the polymer to provide sufficient structure to carry proppant into fractures. Accordingly, in some embodiments, compositions described herein do not include crosslinkers, and in some embodiments the polymer is uncrosslinked or substantially uncrosslinked.

An advantage to using compositions described herein is that the polymers need not be crosslinked, so no crosslinker is required in the composition. Omitting a component simplifies the composition and its manufacture and use and can reduce associated costs. For example, some crosslinker must be activated by pH adjustment. Such pH adjustment is not necessary if the crosslinker is omitted. Moreover, most known crosslinkers are inorganic materials that are not naturally derived. Omitting those materials creates a more environmentally friendly, i.e., a "greener," formulation.

While the polymer and ionic surfactant together create a proppant supporting fracturing gel without the need for a crosslinker, including a crosslinker will not make the composition fail. In fact, crosslinkers may be desirable in some embodiments to further increase the gel strength or for economic or other reasons. For example, the amount of surfactant could be reduced and crosslinker added in an amount to proportionally increase the gel strength to compensate for the reduction in gel strength due to the reduction in surfactant.

After a fracturing fluid has been pumped into a formation to create or enhance fractures, it typically must be "broken," or thinned, so that it can be removed from the formation. Typically, "breakers" are added to the fracturing fluid and are activated at a certain time or upon certain conditions. The use of breakers is well known to one skilled in the art. Another advantage of the compositions described herein is that the polymer/surfactant network is not covalently bonded, so the natural interaction with the rocks and oil will change the structure of the material such that it need not be "broken" like a covalently crosslinked material. Accordingly, some embodiments of the compositions do not include breaker materials. Omitting breaker materials simplifies the composition and its manufacture and use and can reduce associated costs.

Another advantage of using the compositions described herein rather than a crosslinked gel is that the compositions described herein may be used under a wider variety of conditions. For example, the subterranean formations where the compositions are used typically contain salts, such as sodium chloride and potassium chloride, brine clay and other minerals, such as iron oxide. Those impurities are positively charged metal ions that, in many cases, will compete with or displace a metallic ion used as a crosslinker. Those metallic impurities, however, will not interfere, or will interfere to a much lesser extent, with the cationic surfactant used in compositions described herein. Thus, the disclosed compositions are more durable in terms of effectiveness in the presence of iron and metallic salts without the sensitivity of ionic crosslinkers.

The treating fluids described herein optionally may comprise particulates, such as proppant particulates or gravel particulates. Particulates suitable for use in the treating fluids may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments. In certain embodiments, the particulates included in the compositions described herein may be coated with any suitable resin or tackifying agent known to those of ordinary skill in the art. In certain embodiments, the particulates may be present in the compositions described herein in an amount in the range of from about 0.5 pounds per gallon ("ppg") to about 30 ppg by volume of the treating fluid.

The treating fluid may also include a crosslinking agent, among other purposes, to further enhance the viscosity of the treating fluid. The term "crosslinking agent" is defined herein to include any molecule, atom, or ion that is capable of forming one or more crosslinks between molecules of a polymer and/or between one or more atoms in a single molecule of a polymer. The crosslinking agent may comprise a borate, a metal ion, or similar component that is capable of crosslinking at least two molecules of the sulfonated gelling agent polymer(s). Examples of suitable crosslinking agents that can be utilized include, but are not limited to the following: boron compounds such as boric acid, disodium octaborate tetrahydrate, sodium diborate and pentaborates; ulexite; colemanite; compounds that can supply zirconium IV ions such as zirconium lactate, zirconium lactate triethanolamine, zirconium carbonate, zirconium acetylacetonate and zirconium diisopropylamine lactate; compounds that can supply titanium IV ions such as titanium ammonium lactate, titanium triethanolamine and titanium acetylacetonate; aluminum compounds such as aluminum lactate and aluminum citrate; and compounds that can supply antimony ions. In certain embodiments, the crosslinking agent may be formulated to remain inactive until it is "activated" by, among other things, certain conditions in the fluid (e.g., pH, temperature, etc.) and/or interaction with some other substance. In some embodiments, the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including, but not limited to, the following: the type of gelling agent included, the molecular weight of the gelling agent(s), the conditions in the subterranean formation being treated, the safety handling requirements, the pH of the treating fluid, temperature, and/or the desired delay for the crosslinking agent to crosslink the gelling agent molecules.

In certain embodiments, a crosslinking agent may be included in the treating fluid in an amount in the range of from about 2 lbs to about 40 lbs per 1000 gal of the treating fluid. In certain embodiments, a crosslinking agent may be included in the treating fluid in an amount in the range of from about 4 lbs to about 12 lbs per 1000 gal of the treating fluid.

The treating fluids described herein optionally may include one or more of a variety of well-known additives, such as surfactants, de-emulsifiers, scale inhibitors, corrosion inhibitors, catalysts, clay stabilizers, biocides, bactericides, friction reducers, gases, foaming agents, iron control agents, solubilizers, pH adjusting agents (e.g., buffers), and the like. For example, in some embodiments, it may be desired to foam a treating fluid using a gas, such as air, nitrogen, or carbon dioxide. Those of ordinary skill in the art, with the benefit of this disclosure, will be able to determine the appropriate additives for a particular application.

The compositions described herein may be prepared by any method suitable for a given application. For example, certain components of the treating fluid may be provided in a pre-blended powder, which may be combined with the aqueous base fluid at a subsequent time. In preparing the compositions described herein, the pH of the aqueous base fluid may be adjusted, among other purposes, to facilitate the hydration of the gelling agent. The pH range in which the gelling agent will readily hydrate may depend upon a variety of factors (e.g., the components of the gelling agent, etc.) that will be recognized by one skilled in the art. This adjustment of pH may occur prior to, during, or subsequent to the addition of the gelling agent and/or other components of the compositions described herein. For example, the compositions described herein may comprise an ester that releases an acid once placed downhole that is capable of, inter alia, reducing the pH and/or viscosity of the treating fluid. After the pre-blended powders and the aqueous base fluid have been combined, crosslinking agents and/or other suitable additives may be added prior to introduction into the well bore. Those of ordinary skill in the art, with the benefit of this disclosure will be able to determine other suitable methods for the preparation of the compositions described herein.

In practice, compositions consistent with this disclosure may be prepared and shipped to a fracturing site ready to use, or may be shipped as separate components and combined at the site of the fracturing operation. Typically, when compositions are mixed on site the mixing is carried out at the surface and the composition is introduced to the wellbore shortly thereafter. Alternatively, however, at least one of the components of the composition may be introduced to the wellbore separately such that the composition is combined after all of the components are in the wellbore. Thereafter, pressure is used to introduce the composition into the subterranean formation.

The compositions described herein may be used in any subterranean operation wherein a fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), "frac-pack" treatments, well bore clean-out treatments, and other suitable operations where a treating fluid as disclosed herein may be useful.

In some embodiments, a method of treating a subterranean formation includes introducing a treating fluid into a subterranean formation at a rate and pressure sufficient to create or enhance one or more fractures therein, wherein the treating fluid is any fluid disclosed herein, or equivalent thereof. In some embodiments, the treating fluid includes water, a water soluble polymer, and ionic surfactant. The water soluble polymer may be any polymer described herein or equivalent thereof. The ionic surfactant may be any surfactant described herein or equivalent thereof.

To facilitate a better understanding of the disclosed compositions, the following examples of certain aspects of some embodiments are given. In no way should the following examples be read to limit, or define, the scope of the invention.

Sodium carboxymethyl cellulose (NaCMC, 0.7 degree of substitution, MW 90,000) was hydrated in water for 40 minutes. After the anionic polymer dissolved to form a clear solution, the following ingredients were added one at a time: nonionic surfactant Tween 80 (polysorbate 80), sodium chloride, and cationic surfactant cetyltrimethylammonium bromide (CMTAB). The composition was mixed for five minutes. Amounts of each ingredient are shown in Table 1 with the balance water.

TABLE 1

| | Weight % |
|---|---|
| NaCMC | 2.5% |
| CTMAB | 9% |
| Tween 80 | 2.5% |
| NaCl | 1.5% |

The viscosity of the composition was tested on a Chandler 5550 viscometer. The gel shear thickened for approximately 15 minutes to attain a maximum viscosity of 2900 cP. Thereafter it began to shear thin. FIG. 1 is a graph showing the viscosity profile for the NaCMC:CMTAB gel using the Chandler model 5500 viscometer.

Compositions described herein unexpectedly provide a thick gel homogeneous gel without using crosslinkers, high concentrations of polymer, or high concentrations of surfactant. Moreover, oppositely charged surfactant and polymers generally would be expected to precipitate or coagulate. Accordingly, the compositions represent a simplification of the formulas typically used for fracturing fluids by using a material, the ionic surfactant, not expected to be compatible with the polymer.

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions, methods, and aspects of these compositions and methods are specifically described, other compositions and methods and combinations of various features of the compositions and methods are intended to fall within the scope of the appended claims, even if not specifically recited. Thus, a combination of steps, elements, components, or constituents may be explicitly mentioned herein; however, all other combinations of steps, elements, components, and constituents are included, even though not explicitly stated.

What is claimed is:

1. A method of treating a subterranean formation comprising introducing a treating fluid into the subterranean formation at a rate and pressure sufficient to create or enhance one or more fractures therein, wherein the treating fluid is a gel comprising water, a demulsifier, a water soluble polymer, and an ionic surfactant, wherein the water soluble polymer is present in the treating fluid in an amount of 2.5% to 30%, wherein the ionic surfactant is present in the treating fluid in an amount of 6.0% to 40%, and wherein the treating fluid further comprises a plurality of proppant particles in an amount of about 0.5 pounds per gallon (ppg) to about 30 ppg, wherein the viscosity of the treating fluid when the polymer and the ionic surfactant are uncrosslinked is sufficient to keep the proppant particles suspended within the fluid.

2. The method of claim 1, wherein the polymer is neutral and comprises a polysaccharide or derivative thereof.

3. The method of claim 1, wherein the treating fluid does not comprise a crosslinker.

4. The method of claim 1, wherein the polymer is anionic or cationic, wherein when the polymer is anionic the surfactant is cationic, and wherein when the polymer is cationic the surfactant is anionic.

5. The method of claim 4, wherein the polymer is anionic and comprises a polyamine, polyacrylamide, polyglutamate, polyacrylic acid, salt thereof, or combinations thereof.

6. The method of claim 4, wherein the surfactant is cationic and comprises a quaternary ammonium.

7. The method of claim 4, wherein the polymer comprises sodium carboxymethylcellulose and the surfactant comprises cetyltrimethylammonium bromide.

8. The method of claim 4, wherein the polymer is cationic and comprises a quaternary ammonium.

9. The method of claim 4, wherein the polymer is anionic and comprises a polysaccharide or derivative thereof.

10. The method of claim 9, wherein the polysaccharide or derivative thereof is selected from the group consisting of carboxymethyl cellulose, dextran sulfate, hyaluronate, alginate, heparan sulfate, salts thereof, and combinations thereof.

11. A system for creating or enhancing one or more fractures in a subterranean formation comprising a treating fluid, wherein the treating fluid is a gel comprising water, a water soluble polymer in an amount of 2.5 wt % to 30 wt %, an ionic surfactant in an amount of 6.0 wt % to 40 wt %, a de-emulsifier, and a plurality of proppant particles, wherein the viscosity of the treating fluid when the polymer and the ionic surfactant are uncrosslinked is sufficient to keep the proppant particles suspended within the fluid, and wherein the treating fluid is injectable into a wellbore.

12. A composition for treating a subterranean formation comprising a water soluble polymer, an ionic surfactant, a de-emulsifier, and a plurality of proppant particles, wherein the polymer is present in an amount of 2.5 wt % to 30 wt % and the surfactant is present in an amount of 6.0% wt % to 40 wt %, wherein the composition comprises a gel.

13. The composition of claim 12, wherein the composition does not include a crosslinker.

14. The composition of claim 12, wherein the surfactant is cetyltrimethylammonium bromide.

15. The composition of claim 12, wherein the polymer is neutral and the surfactant is anionic or cationic.

16. The composition of claim 12, wherein the composition is injectable into a wellbore.

17. The composition of claim 12, wherein the polymer is anionic or cationic, wherein when the polymer is anionic the surfactant is cationic, and wherein when the polymer is cationic the surfactant is anionic.

18. The composition of claim 17, wherein the polymer is anionic and comprises a polysaccharide or derivative thereof.

19. The composition of claim 18, wherein the polysaccharide or derivative thereof is sodium carboxymethyl cellulose.

* * * * *